US005608729A

United States Patent [19]

Orsic

[11] Patent Number: 5,608,729
[45] Date of Patent: Mar. 4, 1997

[54] METHOD AND APPARATUS FOR PROVIDING TWO-WAY DATA COMMUNICATION COVER A WIDELY DISTRIBUTED NETWORK

[75] Inventor: Milo Orsic, Lincolnwood, Ill.

[73] Assignee: Lucent Technologies Inc., Murray Hill, N.J.

[21] Appl. No.: 425,557

[22] Filed: Apr. 20, 1995

[51] Int. Cl.[6] .......................... H04L 12/413; H04L 12/44
[52] U.S. Cl. ............................................................. 370/445
[58] Field of Search ................................ 370/85.1, 85.2,
370/85.3, 85.9, 85.11, 93, 94.1, 94.3, 85.13;
340/825.5, 825.07

[56] References Cited

U.S. PATENT DOCUMENTS

| 4,531,238 | 7/1985 | Rawson et al. | 370/93 |
|---|---|---|---|
| 4,646,293 | 2/1987 | Okada et al. | 370/85.3 |
| 4,658,396 | 4/1987 | Barden | 370/85.1 |
| 4,755,990 | 7/1988 | Bohler et al. | 370/85.3 |
| 4,757,460 | 7/1988 | Bione et al. | 370/85.3 |
| 4,825,435 | 4/1989 | Amundsen et al. | 370/85.3 |
| 5,172,413 | 12/1992 | Bradley et al. | 380/20 |
| 5,251,203 | 10/1993 | Thompson | 370/94.3 |
| 5,272,700 | 12/1993 | Hansen et al. | 370/85.3 |
| 5,361,259 | 11/1994 | Hunt et al. | 370/84 |
| 5,369,639 | 11/1994 | Kamerman et al. | 370/85.3 |
| 5,384,767 | 1/1995 | Moorwood et al. | 370/13.1 |
| 5,453,737 | 9/1995 | Opoczynski | 370/85.11 |

OTHER PUBLICATIONS

Metcalfe et al. "Ethernet: Distributed Packet Switching for Local Computer Networks", 1976, pp. 3–12.

Primary Examiner—Douglas W. Olms
Assistant Examiner—Chau T. Nguyen
Attorney, Agent, or Firm—Jack R. Penrod

[57] ABSTRACT

An architecture for a distributed CSMA/CD network using IEEE 802.3 protocol that is widely extended between transmitting and receiving nodes by placing some of the idle/busy/collision functions in one or more protocol control nodes which are located between the other nodes. The protocol control nodes do not perform resynchronization and are not bridge nodes, so their use does not cause any time delays. One application would be a cable TV system where the distant nodes would be the cable office node that is widely separated from a group of neighborhood local nodes. A protocol control node intermediately placed in close proximity to the local nodes provides the idle/busy/collision control functions while allowing the central office node to be located beyond the IEEE 802.3 maximum distance.

10 Claims, 6 Drawing Sheets

METHOD AND APPARATUS FOR PROVIDING TWO-WAY DATA COMMUNICATION COVER A WIDELY DISTRIBUTED NETWORK

TECHNICAL FIELD

The invention relates to data communication over a network, and more particularly to a method and apparatus for providing two-way data communication over a network spatially distributed over many kilometers, such a cable network.

DESCRIPTION OF THE PRIOR ART

Networks, such as Local Area Networks (LANs), which use carrier sensed multiple access with collision detection (CSMA/CD) protocol are very popular for data communications. CSMA/CD protocol requires each node which has data to transmit over the network to first sense the channel for a carrier and if no carrier is sensed, begin transmitting its own carrier and data over the network. Each node transmits data in the form of packets or frames having known bit and frame time characteristics. Since, according to statistics, two or more randomly transmitting nodes will sometimes find the common channel devoid of carrier signals and begin transmitting at virtually the same time, collisions between frames do occur. Collisions are detected by checking the bit and frame timing characteristics of the received data. Typically a received frame that resulted from a collision is too short since once a collision is detected the transmitting nodes stop transmitting, usually before the end of a standard frame. Alternatively, a frame could be too long if it is made up of a partial interference and a partial concatenation of two or more different data frames. Further, a received frame could have improper signal levels and bit times caused by a collision that are sensed by a collision detector. Thus, each received frame is checked for timing characteristics and if the characteristics are not appropriate, the received frame is discarded and a re-transmit request is broadcast by the first node actively receiving the frame, e.g., a node to which the frame appears to be addressed. According to the CSMA/CD protocol, if the receiving node makes no response to a frame, that indicates that the transmitted frame was received with valid data and without a collision. That being the case, since a node obviously cannot wait forever for a re-transmit message, a response window in which the destination node must respond with a re-transmit message if a collision occurred is defined as part of CSMA/CD protocol to keep the throughput at a high level, this response window is deliberately defined to be short. According to this protocol, re-transmit messages after the predetermined response time window are ignored. Unfortunately, because signal propagation along a network has a finite characteristic propagation velocity, under the standard CSMA/CD protocol even a short response time window requirement also places a maximum distance limit between the transmitting nodes and the destination nodes of CSMA/CD networks.

If a distance greater than the maximum distance limit is desired, a bridge to a second network, as shown in FIG. 1 or a repeater as shown in FIG. 2 is typically used. A bridge node receives a frame bound for a distant node, buffers it and re-transmits the frame on the second LAN. A bridge node essentially receives the frame at the end of a first LAN and then re-transmits the frame on a second LAN thereby increasing the maximum distances by two. Adding further bridges extends the maximum distance even more. Each LAN must provide its own collision detection. A repeater re-synchronizes a frame as the frame travels to the destination node. A repeater node provides buffering in order to re-synchronize the bit timing and restore the bit amplitudes to each frame passing through the repeater. Repeaters will only extend the operating distance of a LAN if signal to noise ratio or attenuation is a problem, otherwise they will actually shorten the maximum operating distance. The buffering used by the bridge node and the repeater node inherently injects delay into the data communication of their respective networks. Thus, there is a need in the art for a network which has wide distances between the transmitting node and the destination node that operates according to CSMA/CD protocol which does not have the delays caused by buffering in bridge nodes and repeater nodes.

SUMMARY OF THE INVENTION

Briefly stated, in accordance with one aspect of the invention, the aforementioned problem is solved and an advance in the art is achieved by providing in a network system having a number of local nodes connected by a channel to at least one upstream node at an extended distance from the local nodes. Each upstream node receives frames, checks for collisions, and discards frames that have experienced a collision or which are not addressed to the respective upstream node. These CSMA/CD protocol functions do not have strict time limits, so these functions can be provided by each upstream node at a greater distance if an intermediate node mediately located between each local node and each upstream node provides the collision detection and related control functions of the CSMA/CD protocol within its strict time limits. Thus, the time critical control functions of the CSMA/CD protocol are physically and spatially separated from the non-time critical frame receiving and processing CSMA/CD protocol functions. With this arrangement, the intermediate node providing the time critical functions is located within the distance limitations, while each upstream node may be located either within the previous distance limitations or at an extended distance beyond the previous distance limitations.

In accordance with another aspect of the invention, the aforementioned problem is solved by providing a method for preventing the use of a data frame that has undergone a collision within a network having a plurality of local nodes in a widely spaced relation with an upstream node, which includes the steps of sensing for an idle status of an upstream channel by a first local node before transmitting a first data frame, sensing for an idle status of the upstream channel by a second local node before transmitting a second data frame, detecting an idle status by both the first and second local nodes and both begin transmitting their respective data frames causing a collision on said upstream channel. This collision is detected by the intermediate node monitoring the upstream channel and upon detecting the collision sending a collision control signal to each local node stopping each node before it completes the transmission of its respective data frame. The resulting data frame, which is shorter than a standard data frame because it has undergone this collision, is detected by the upstream node and discarded.

DETAILED DESCRIPTION

Figure 1:
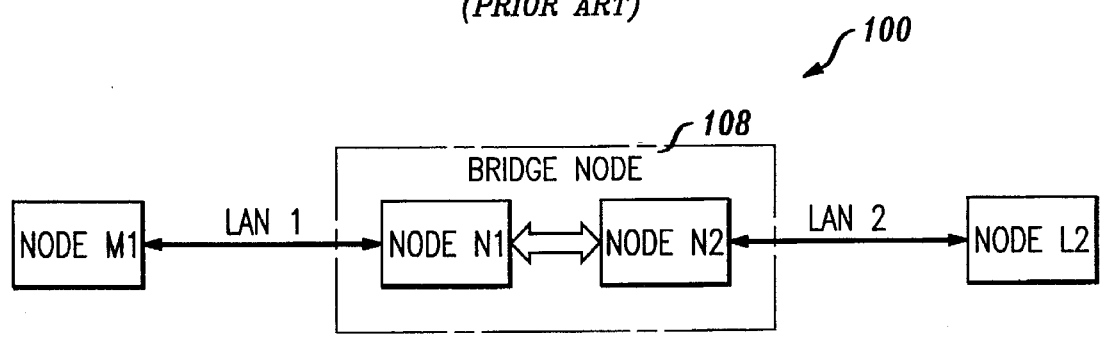
FIG. 1 is a block diagram of a prior art system having two CSMA/CD LANs connected by a bridge node.

In FIG. 1, a known communication system 100 is shown that is made up of two individual LANs: LAN1 and LAN2. Two LANs are needed because the distance between Node__M1 of LAN1 and Node__L2 of LAN2 is beyond that allowed by standard CSMA/CD timing described in IEEE 802.3 standard, which is hereby incorporated by reference. Thus, two LANs connected by a bridge node 108 are used to connect the distant nodes. If two are not enough, multiples beyond two could be used. Bridge node 108 is actually two nodes, Node__N1 of LAN1 and Node__N2 of LAN2 connected together. Frames from a node on LAN1 which have a destination node on LAN2 are received by the Node__N1 and then transferred to Node__N2 for transmission on LAN2. Node__N2 must provide all of the CSMA/CD protocol for the frame to be transmitted on LAN2. As can be appreciated, bridge node 108 is fairly complex and necessarily inserts a time delay since each frame must be retransmitted with full CSMA/CD protocol onto LAN2.

Figure 2:
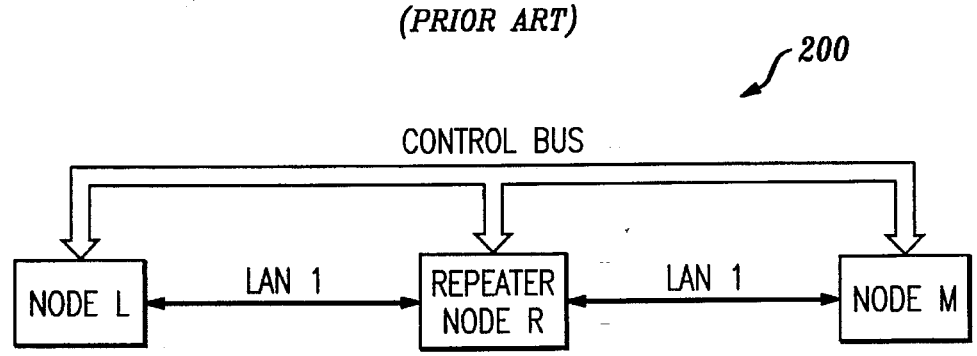
FIG. 2 is a block diagram of a prior art system having a CSMA/CD LAN with a repeater node.

In FIG. 2, a simplified representation of a known communication system 200, which has a LAN__1 in which a frame from Node__L to Node__M must go through repeater node, Node__R. A more complicated repeater system is shown in U.S. Pat. No. 4,825,435. Repeater node Node__R resynchronizes the data within a packet and does some amplitude and other waveshaping, so frames can travel to their distance limit, but repeater node Node__R does not provide any new procedure or mechanism for extending the distance between nodes beyond the IEEE 802.3 single LAN limits. So at best the repeater provides operation to the maximum distance of a single LAN, but because a small time delay is involved, the result is actually just a little short of the maximum LAN distance.

Figure 3:
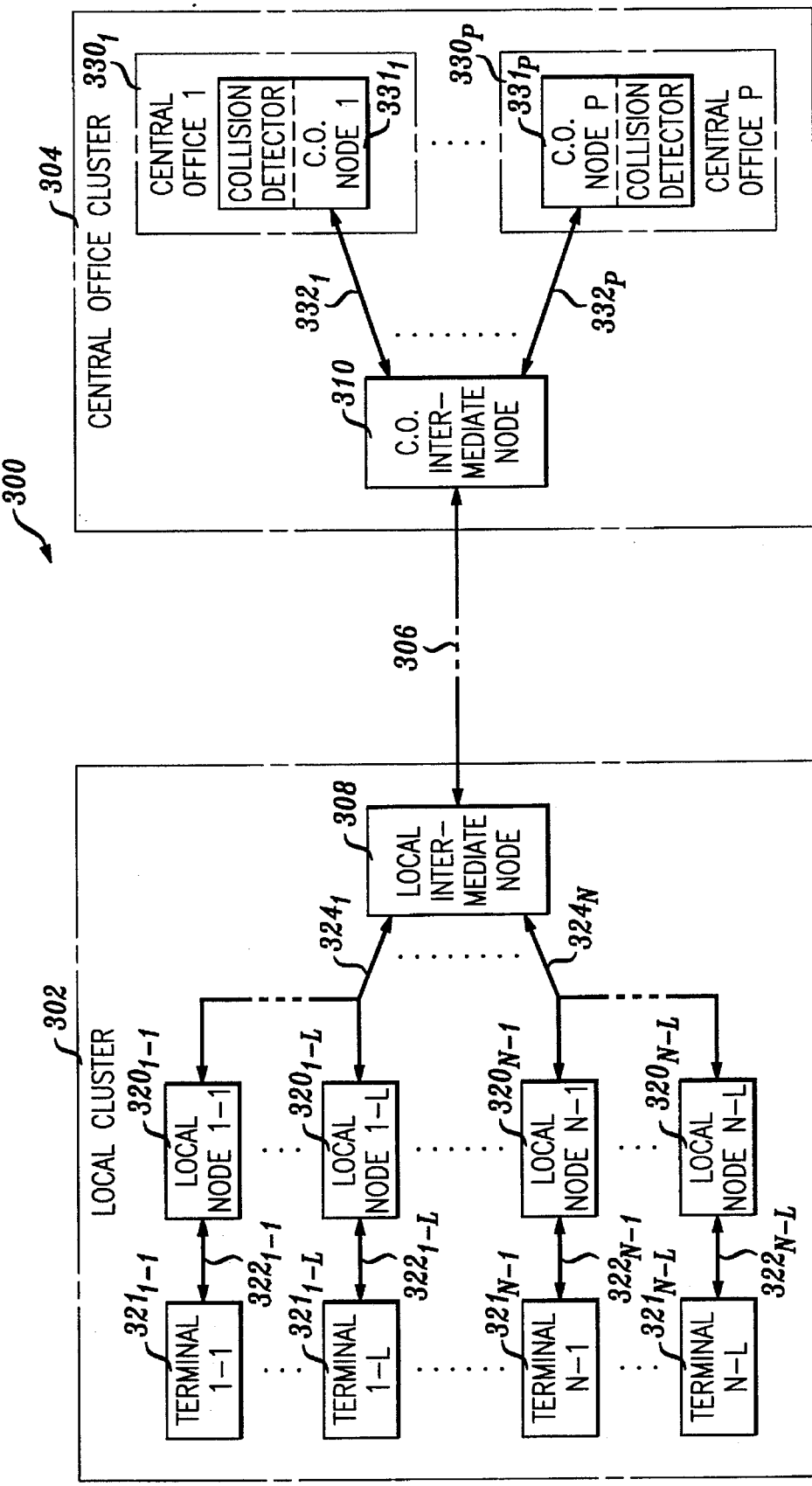
FIG. 3 is a block diagram of a network arrangement according to one embodiment of the present invention.

Referring now to FIG. 3, a network system 300 is shown. Network system 300 has a local cluster 302 and a central office cluster 304 connected by a full duplex communication path 306. Communication path 306 may be longer than the maximum distance between transmitting and receiving nodes for CSMA/CD as set by IEEE 802.3 because of the operation of intermediate node 308 of local cluster 302 and intermediate node 310 of central office cluster 304 according to the present invention.

Local cluster 302 contains a number of local nodes $320_1$–$320_N$. Each local node $320$–$320_N$ is connected by a respective line of lines $322_1$–$322_N$ to a respective terminal $321_1$–$321_N$, which may be a computer or it maybe a set to box. Lines $322_1$–$322_N$ are bi-directional because computers and set to boxes typically are interactive units communicating data and/or messages to and from an upstream unit, such as an internet server or an asynchronous transfer mode server in central office cluster 304.

Each of the local nodes $320_1$–$320_N$ is connected to intermediate node 308 by a respective multi-channel line $324_1$–$324_N$. Each of the multi-channel lines $324_1$–$324_N$ may be multi-conductor, electrical or optical, or may be a single conductor with frequency division channels. If frequency division channels are used, then a receive and/or transmit function to demodulate and/or modulate IEEE 802.3 compatible frames must be respectively provided at each end of lines $324_1$–$324_N$. Each local node $320_1$–$320_N$ has a transmit portion that is connected by a uni-directional channel of its respective line $324_1$–$324_N$ to monitoring portion of local intermediate node 308. Monitoring portion of local intermediate node 308 receives all the frames transmitted upstream from the local nodes $320_1$–$320_N$. These upstream frames are summed at local intermediate node 308 and the resulting signal propagates upstream to communication path 306. Communication path 306, like lines $324_1$–$324_N$, is a multi-channel path which may be realized by a multi-conductor cable, electrical or optical, or by frequency division multiplexed channels on a single conductor cable, electrical or optical. Communication path 306, also like lines $324_1$–$324_N$, has a uni-directional upstream channel. The upstream frames are also monitored by intermediate node 308 to determine if a collision between frames from two or more local nodes $320_{1-1}$–$320_{N-L}$ have collided. A collision of upstream frames at intermediate node 308 will remain a collision as it propagates along communication path 306 and as it reaches central office cluster 304. Some of the frames traveling along different lines $324_1$–$324_N$ will be isolated from each other until they reach intermediate node 308, where the collision occurs. Any collision that is detected is reported on a control channel, which is a narrow band, independent channel connected between intermediate node 308 and local nodes $320_{1-1}$–$320_{N-L}$ as part of lines $324_1$–$324_N$. This channel reports the idle/busy/collision status of the upstream channel according to IEEE 802.3 protocol. Intermediate node 308 improves collision recovery time and maintains IEEE 802.3 CSMA/CD protocol for collisions by monitoring and reporting the collision instead of the distantly located nodes of the central office cluster 304.

Since the upstream path which upstream frames follow is uni-directional, the only collisions that are possible along the upstream path are collisions between frames from local nodes $320_{1-1}$–$320_{N-L}$. This also means that local nodes $320_{1-1}$–$320_{N-L}$ cannot communicate to each other via the connections shown in FIG. 3, which is why network 300 is not technically a LAN, even though cluster-to-cluster packet communications according to IEEE 802.3 are provided thereby.

Central office cluster 304 is very similar to that of local cluster 302. Central office cluster 304 has an intermediate node 310 which is functionally the same as intermediate node 308. Intermediate node 310 is connected to central office units $330_1$–$330_P$ by lines $332_1$–$332_P$. Each of lines $332_1$–$332_P$ is a multi-channel line which has a unidirectional upstream channel and a narrow band, bi-directional control channel. Each of the lines $332_1$–$332_P$ may use multi-conductors or frequency division multiplexing to provide the multi-channel. For the case of upstream frames, intermediate node 310 is a fanout point to convey the upstream packets from communication path 306 to the units $330_1$–$330_P$. Intermediate node 310 may do transparent functions, such as conversion from optical to electrical signaling, but otherwise does not perform IEEE 802.3 CSMA/CD type of protocol monitoring of the upstream frames. Each of the units $330_1$–$330_P$ has a central office node $331_1$–$331_P$ which for upstream frames provides standard CSMA/CD protocol processing. One of the important functions that each central office node $331_1$–$331_P$ provides is monitoring of its received frames. If a received frame, i.e. one that was both communicated and addressed to a central office node, has undergone a collision, the frame is discarded as void. No collision or re-transmit message is sent, because the collision of these frames should have been determined earlier at local intermediate node 308 and a collision and/or re-transmit message sent then. So, each central office node $331_1$–$331_P$ will only accept upstream frames that have not undergone collisions and that are addressed to its respective unit $330_1$–$330_P$ with either an exclusive or a multicast/broadcast address.

Figure 4A:
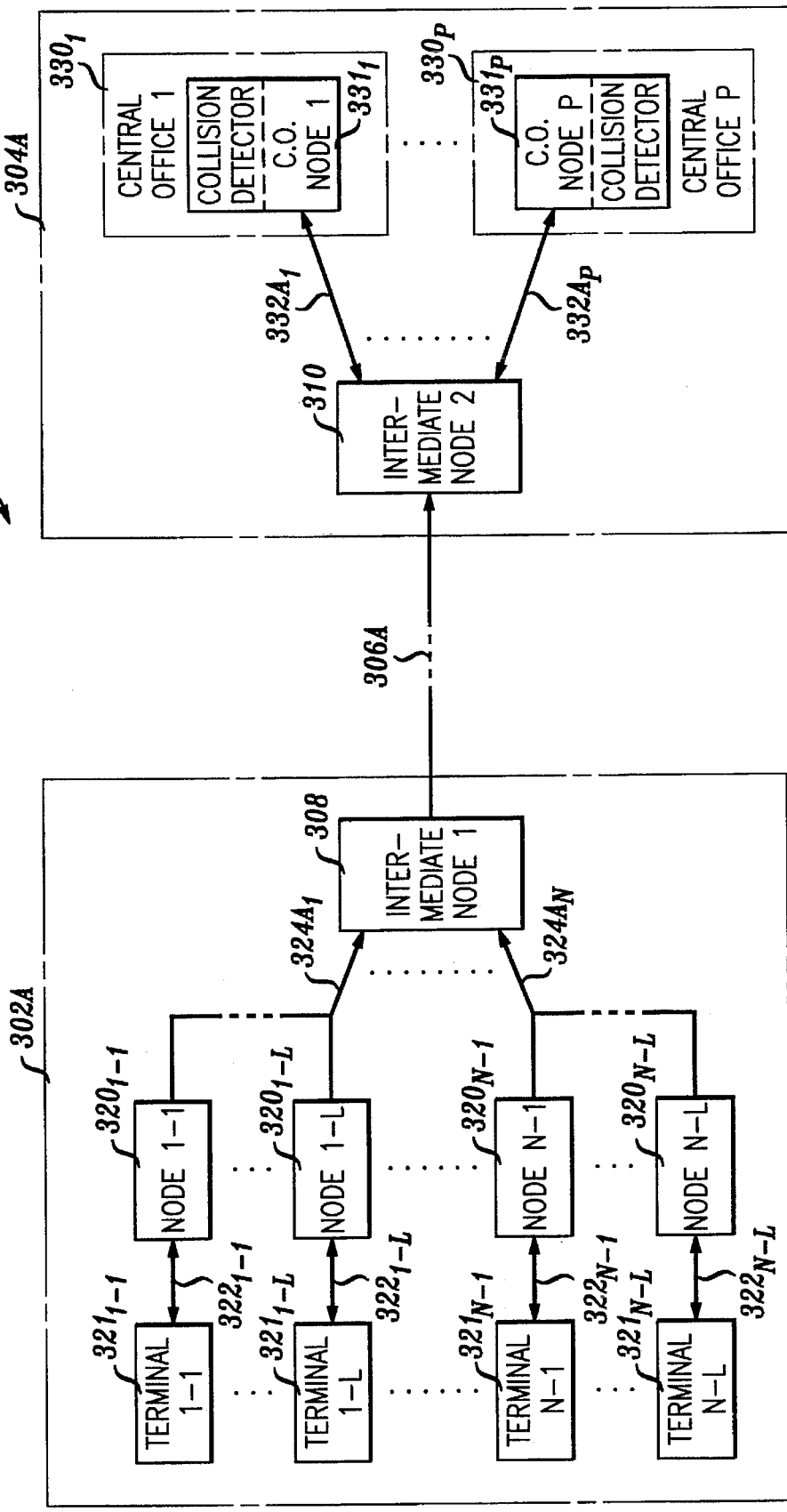
FIG. 4A is a block diagram of a network arrangement as shown in FIG. 3 that is transmitting data only in an upstream direction.

FIG. 4A illustrates the upstream operating portion 400A of the network 300 of FIG. 3. The main differences are the directionality and the number of channels involved in the upstream function. For upstream frames, communication channel 306 in FIG. 3, becomes a unidirectional communication path 306A. Also lines $332A_1$–$332A_P$ are single channel, uni-directional lines because the control channel is not used within the central office cluster 304A for receiving and processing upstream directed frames.

Figure 4B:
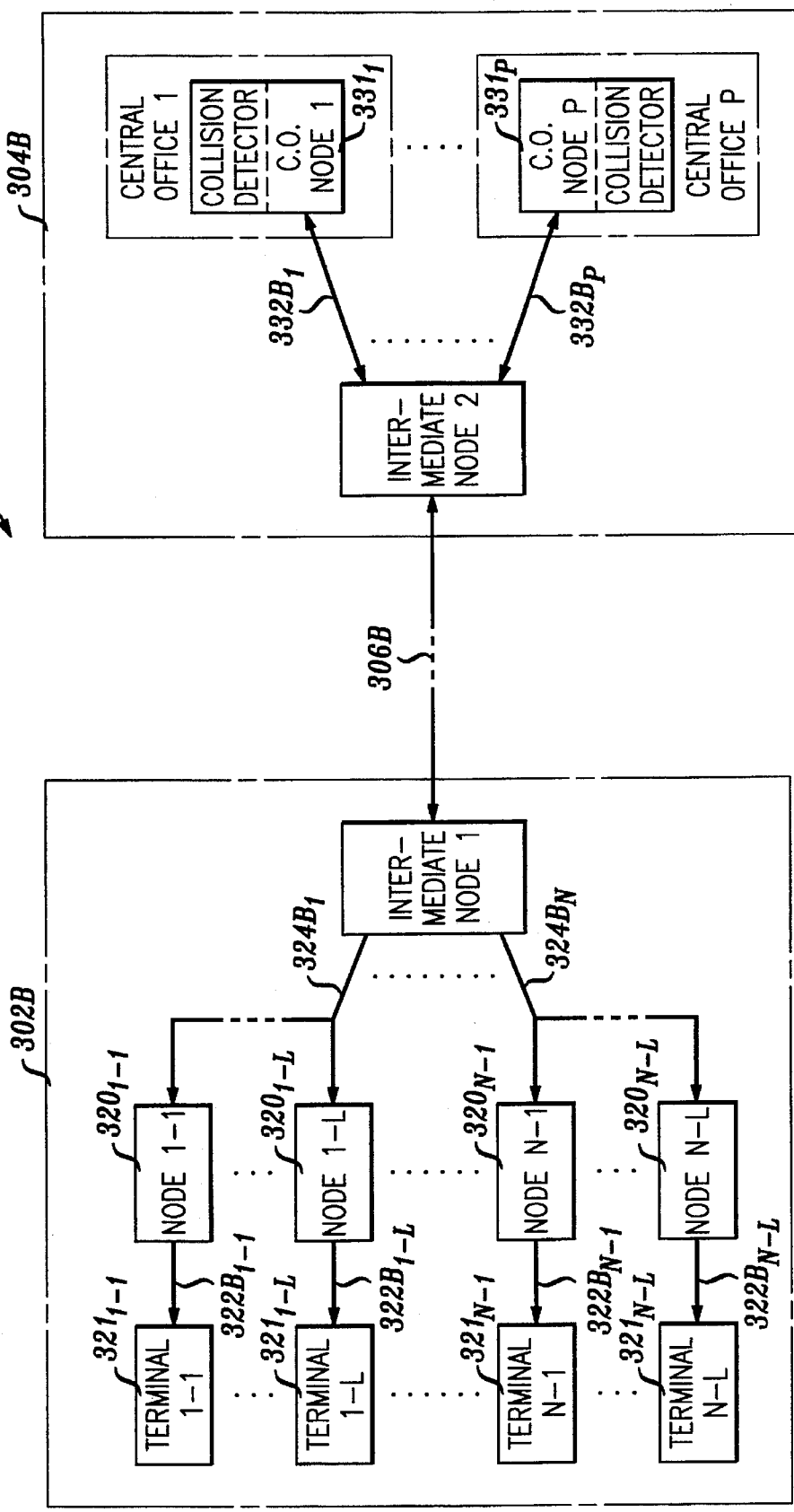
FIG. 4B is a block diagram of a network arrangement as shown in FIG. 3 that is transmitting data only in a downstream direction.

FIG. 4B illustrates the downstream operating portion 400B of the network 300 of FIG. 3. The downstream operating portion 400B has central office nodes $331_1$–$331_P$ of units $330_1$–$330_P$ connected by lines $332B_1$–$332B_P$ to intermediate node 310. Each of lines $332B_1$–$332B_P$ contains a uni-directional channel connecting its respective central office node $331_1$–$331_P$ to communicate frames using IEEE 802.3 CSMA/CD protocol to node 310, communication path 306B and local cluster 302B. Each of lines $332B_1$–$332B_P$ also contains a narrowband control channel connected between busy/idle/collision status port of the intermediate node 310 and respective central office node $331_1$–$331_P$ so that busy/idle/collision status information is shared among all nodes within central office cluster 304B. For downstream frames, communication channel 306 in FIG. 3, becomes a unidirectional communication path 306B. Also lines $324B_1$–$324B_N$ are single channel, uni-directional lines because the control channel is not used within the local cluster 302B for receiving and processing downstream directed frames. For downstream frames, intermediate node 308 is a fanout point to convey the downstream frames from communication path 306B to the local nodes $320_{1-1}$–$320_{N-L}$. Intermediate node 308 may do transparent functions, such as conversion from optical to electrical signaling, but otherwise does not perform IEEE 802.3 CSMA/CD type of protocol monitoring of the downstream frames. Instead, each of the local nodes $320_{1-1}$–$320_{N-L}$ provides partial standard CSMA/CD protocol processing for downstream directed frames. One of the important protocol functions that each local node $320_{1-1}$–$320_{N-L}$ provides is monitoring of its received frames. If a received frame, e.g., one that was both communicated and addressed to a local node, has undergone a collision, that frame is discarded as void. No collision or re-transmit message is sent, because the collision of these frames should have been determined earlier at central office intermediate node 310 and a collision and/or re-transmit message sent then. So, each local node $320_{1-1}$–$320_{N-L}$ will only accept downstream frames which have not undergone collisions and which are addressed to its respective local node $320_{1-1}$–$320_{N-L}$ with either an exclusive or a multicast/broadcast address. An alternative embodiment of the invention is one in which the number of units $330_1$–$330_P$ is one. For such an embodiment, collisions on the unidirectional downstream channel are not possible, so collision detection by the receiving portion of local nodes $320_{1-1}$–$320_{N-L}$ is not needed. Such an embodiment will be described below.

Figure 5:
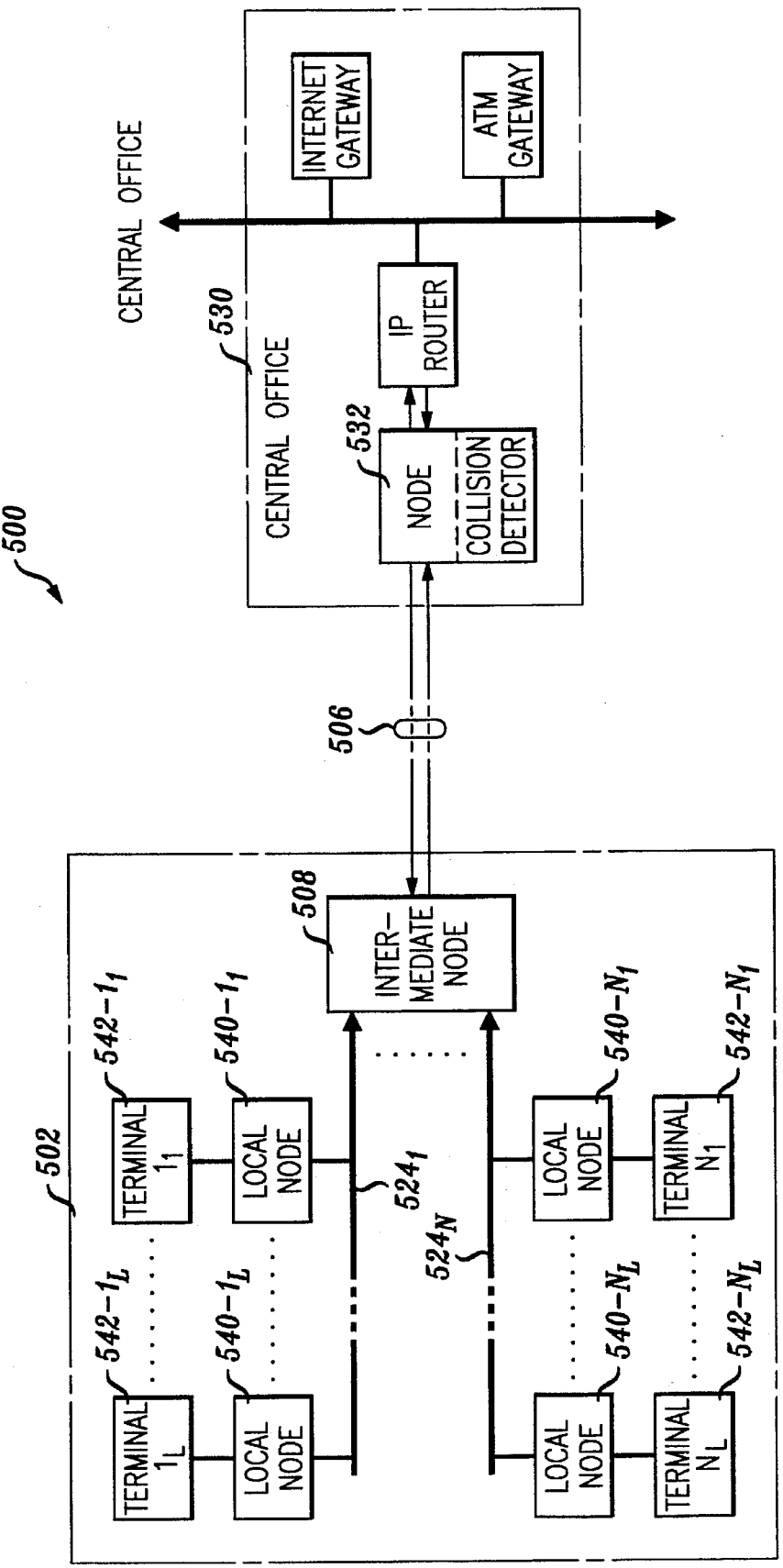
FIG. 5 is a block diagram of a network arrangement of a specific embodiment of the present invention.

Referring now to FIG. 5, a communication system 500 according to one embodiment of the present invention is shown. The communication system 500 has a local cluster 502 and a central office unit 530 connected by communication path 506. Communication path 506 consists of two uni-directional channels carried by one or more optical fibers. Preferably, each uni-directional channel is separated from the other uni-directional channel by frequency division multiplexing techniques.

Central office unit 530 is very similar to central office units $330_1$–$330_P$ shown in FIG. 3, however, since the communication system 500 has only one central office unit 530, a few simplifications have been made. Since collisions are impossible on the downstream uni-directional channel with only one unit, central office unit 530, an intermediate node, such as intermediate node 310 of FIG. 3, is not needed. Further, since collisions on the downstream channel are impossible, monitoring of the channel for idle/busy collision status and control of IEEE 802.3 frames to avoid collisions by central office unit 530 is not necessary. Central office unit 530 may seize the downstream channel and start sending data whenever the need arises. This means the design of central office node 532 for downstream directed frames can be greatly simplified with respect to CSMA/CD protocol.

Local cluster 502 is somewhat more complex than the local cluster 302 shown in FIG. 3. Local cluster 502 is connected to communication path 506 at intermediate node 508. Intermediate node 508 is also connected to lines $524_1$–$524_N$. Each of the N lines $524_1$–$524_N$ is connected to a number L of local nodes 540-$1_1$ to 540-$1_L$, to 540-$N_1$ to 540-$N_L$ for a total of N×L local nodes. Further, each local node 540-$1_1$ to 540-$N_L$ is connected to a respective terminal 542-$1_1$ to 542-$N_L$, which may be a personal computer or similar device. Each terminal 542-$1_1$ to 542-$N_L$ communicates with its respective local node 540-$1_1$ to 540-$N_L$ using an IEEE 802.3 protocol known as 10BaseT. Embodiments with the number of lines N=1 with the number of local nodes L=120, and with the number of lines N=4 with the number of local nodes per line L=120 are contemplated, and these are given by way of example, not limitation. The terminals 542-$1_1$ to 542-$N_L$ by way of their respective local nodes 540-$1_1$ to 540-$N_L$ statistically share the intermediate node 508.

Figure 6:
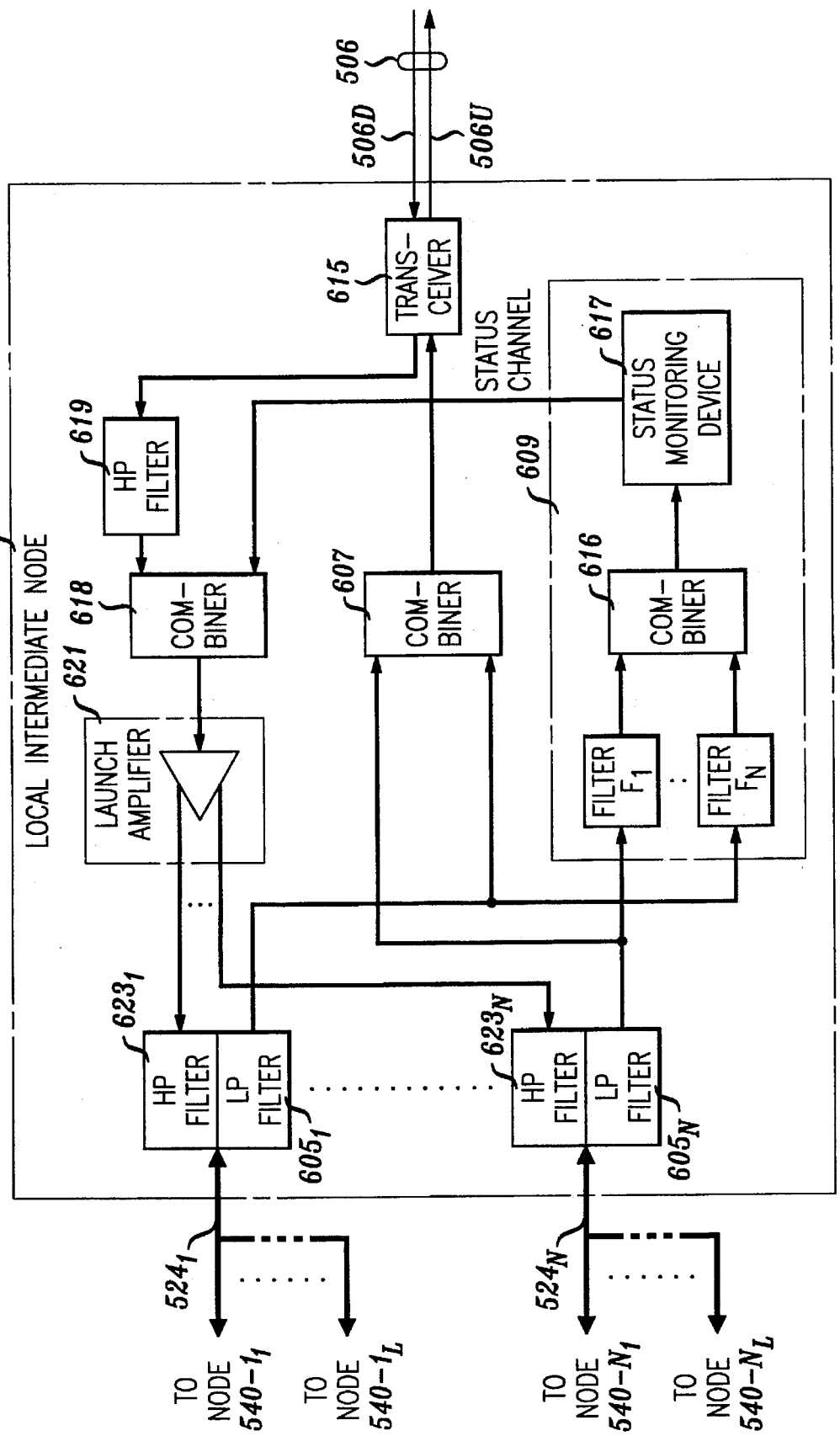
FIG. 6 is a detailed block diagram of a local intermediate node shown in FIG. 5.

Referring now to FIG. 6, intermediate node 508 is shown in greater detail. Intermediate node 508 provides a number of functions: combining and transmitting upstream frames from local nodes 540-$1_1$–540-$N_L$ to an upstream channel of communication path 506, monitoring those upstream frames for collisions as the N data lines $524_1$–$524_N$ are combined into a single upstream channel of communication path 506, monitoring for busy and idle conditions on the N lines $524_1$–$524_N$, transmitting status data on a status channel, and receiving downstream frames on a downstream channel and fanning these frames out to each of the N lines $524_2$–$524_N$.

The N lines, $524_1$–$524_N$, carry multiple data channels. A low frequency channel, which is a 6.4 megabits per second channel that is an upstream channel, a high frequency channel, which is a 10 megabit per second channel that is a downstream channel, and one high frequency, narrowband channel for carrying the status information. The 6.4 megabit per second upstream channel is statistically shared using CSMA/CD techniques by the N×L terminals 542-$1_1$ to 542-$N_L$, which in the preferred embodiment is located at N×L individual private homes, would carry the data frames to the central office unit 530 (shown in FIG. 5). In intermediate node 508, the lines $524_1$ to $524_N$ are connected to low frequency band pass filters $605_1$–$605_N$ which filter the incoming data packets and communicate them to combiner 607 and status monitor 609 in parallel. Each of the lines $524_1$ to $524_N$ has an individual input to combiner 607 and to monitor 609. The output of the combiner 607 is a sum signal which is connected to transmitting portion of transceiver 615. Transceiver 615 provides a radio frequency to optical frequency conversion and transmits the upstream signals over optical channel 506U. It is worth noting that an upstream data frame does not have to be valid in order to go through combiner 607 or transceiver 615. As a matter of fact, it is contemplated that some of the data frames which pass through combiner 607 and transceiver 615 will have experienced a collision of some type, either between two nodes on the same line of lines $524_1$ to $524_N$, on different lines of $524_1$ to $524_N$, or both. Managing such collisions is the responsibility of the local nodes $540\text{-}1_1\text{--}540\text{-}N_L$ and monitor 609, as described below.

Monitor 609 has its inputs connected in parallel with the inputs of combiner 607 such that monitor 609 receives the same input data packets from lines $524_1$ to $524_N$ and through low band pass filters $605_1\text{--}605_N$ that combiner 607 receives. Monitor 609 filters these inputs with individual bandpass filters $F_1\text{--}F_N$ for the upstream channel frequency band, which are in addition to the low band pass filters $605_1\text{--}605_N$. Input filters $F_1\text{--}F_N$ remove noise that may have resulted from external sources or collisions of data frames. After the input filters $F_1\text{--}F_N$, the inputs are combined by a combiner 616. The output of combiner 616 is connected to status monitoring device 617. Status monitoring device 617 monitors the combined inputs of all the upstream lines $524_1$ to $524_N$ to determine one of three states for the upstream data channel: idle, busy or collision. With these three states, a media access protocol for the upstream data channel is provided that is an IEEE 802.3-like CSMA/CD protocol. Since upstream lines $524_1\text{--}524_N$ are isolated from each other until intermediate node 508, collisions between frames on different lines $524_1\text{--}524_N$ are determined at intermediate node 508 and the collision status signaled by the status control channel(s). This same isolation makes monitoring and reporting the "busy" status on the status control channel(s) an important function of intermediate node 508 also. Then the status of the upstream data channel as determined by the status monitoring device 617 is reported on one or more narrowband control channel(s) using signaling techniques mentioned previously. This narrowband control channel(s) connect(s) to the downstream data channel at combiner 618 and becomes a frequency division multiplexed part of the downstream channel thereafter.

To implement the narrowband status control channel status reporting, the status monitoring device 617 outputs one narrow band, high frequency control channel with data sequences 00 . . . 00 to denote a busy upstream channel status, 11 . . . 11 to denote a collision upstream channel status, and NO SIGNAL condition to denote an idle upstream channel status. Alternatively, monitoring device 617 outputs two narrow band, high frequency control channels: the first will have CARRIER OFF if the upstream channel has an idle status and CARRIER ON if the upstream channel has a busy status, and the second will have CARRIER ON if the upstream channel has a collision status and CARRIER OFF if the upstream channel has a no collision status.

Referring now to FIGS. 5 and 6, each of the local nodes $540\text{-}1_1$ to $540\text{-}N_L$ when accessing the upstream data channel examines the status control channel(s). If the upstream data channel is idle, a local node, for example local node $540\text{-}1_L$, with data for the central office unit 530 will start transmitting a frame of data. During transmission, the transmitting local node $540\text{-}1_L$, continuously monitors the status of the upstream data channel by monitoring line $524_L$ to which it is connected and the status control channel(s). If a collision is detected during the collision window of the local cluster 502, local node $540\text{-}1_L$ and any other local node transmitting at the time of the collision will follow standard IEEE 802.3 protocol, which means it will stop transmitting its frame and execute a binary back off algorithm before trying a re-transmission.

Consider, for example, if the two most distant local nodes are located less than 4 kilometers from the intermediate node 508, a maximum delay between the respective local nodes and the intermediate node 508 of less than 20 micro seconds may be achieved. The collision window for this case is less than 80 micro seconds. Hence, if the collision window is less than 80 micro seconds, the invalid frames resulting from any collision and received upstream at central office unit 530, which may be more than 80 micro seconds round trip away because of the present invention, will have less than 64 bytes and will be discarded as required by IEEE 802.3. This timing result may be calculated by noting that if the 6.4 mega bit per second upstream data channel transmits for less than 80 microseconds, the resulting frame is less than 64 bytes long. As shown by:

Max. Size Packet is less than:

$$\frac{6.4 \text{ Mb/sec} \times 80 \text{ Micro sec}}{8 \text{ bits}} = 64 \text{ bytes}$$

When a local node, for example again local node $540\text{-}1_L$, has data for the central office unit 530, the local node first examines the status control channel and if it says the status of the upstream data channel is busy, then the local node $540\text{-}1_L$ follows IEEE 802.3 protocol. After finding the status of the upstream data channel to be busy, local node $540\text{-}1_L$, monitors the status control channel(s) to determine when the upstream data channel again becomes idle. The status of the upstream data channel is indicated to be idle, local node $540\text{-}1_L$ begins to transmit a frame of data on the upstream data channel. Local node $540\text{-}1_L$ continuously monitors its local line $524_L$ the status control channel(s) for any collision status indication. If a collision is indicated during the transmission of the frame of data by local node $540\text{-}1_L$, the collision indication will cause local node $540\text{-}1_L$, and any other local node transmitting at the time, to follow standard IEEE 802.3 protocol by stopping the transmission of the present frame and executing a binary back off algorithm before trying a re-transmission, as described previously.

The downstream data channel carries data frames from central office unit 530. The central office unit 530 formats a data frame that is directed to a specific terminal of terminals $542\text{-}1_1\text{--}542\text{-}N_L$, with a destination address for that terminal. Alternatively, data may be sent to a terminal or group of terminals by formatting the data frame with a multicast/broadcast address which each terminal in the group can receive. As the downstream data enters intermediate node 508, it is received by transmitter 615, and communicated to high pass filter 619. High pass filter 619 filters out any noise below the frequency of the downstream data channel at this point and communicated to combiner 618. As mentioned previously, combiner 618 combines the downstream data from central office unit 530 with the status control channel(s) of local cluster 502. From the combiner 618, the downstream data channel and the status control channel(s) are communicated to a launch amplifier which amplifies these channels and drives their data through high band pass filters $623_1$–$623_N$ to lines $524_1$–$524_N$. Local nodes $540$-$1_1$–$540$-$N_L$ and their respective terminals $542$-$1_1$–$542$-$N_L$ respond to the downstream data frames according to IEEE 802.3 protocol in order to receive the data from central office unit 530.

Thus, it will now be understood that there has been disclosed a new method and apparatus for providing full duplex communications over a network. While the invention has been particularly illustrated and described with reference to preferred embodiments thereof, it will be understood by those skilled in the art that various changes in form, details, and applications may be made therein. For example, the terminals could be home computers and/or set top boxes for receiving data from the central office unit, and the central office unit could serve as a router for access to systems providing internet protocol or asynchronous transfer mode protocol services. It is accordingly intended that the appended claims shall cover all such changes in form, details and applications which do not depart from the true spirit and scope of the invention.

The invention claimed is:

1. An apparatus for communicating comprising:

an upstream node;

a communication path, having an upstream channel and a downstream channel, connected to said upstream node;

a first local node connected to said communication path at a spaced location from said upstream node;

a second local node connected to said communication path at a second spaced location from said upstream node;

an intermediate node connected to said communication path at an intermediate location between said first local node and said upstream node;

a control channel connected to said intermediate node, said first local node and said second local node;

said intermediate node monitors said communication path for a busy condition and if a busy condition is detected, said intermediate node drives said control channel with a busy signal which inhibits any of said first and second nodes that has not presently seized said upstream channel from doing so, and if a busy condition is not detected, said intermediate node provides said control channel with an idle signal which permits any of said first and second nodes to seize the upstream channel and start transmitting to said upstream node;

wherein a change from idle to busy or busy to idle is detected faster and a control signal on said control channel communicates the change of the status of said upstream channel from idle-to-busy or busy-to-idle more quickly because said intermediate location has smaller propagation delays within the channels than would occur if the monitoring were performed at the upstream node.

2. An apparatus for communicating comprising:

an upstream node;

a communication path, having an upstream channel and a downstream channel, connected to said upstream node;

a first local node connected to said communication path at a spaced location from said upstream node;

a second local node connected to said communication path at a second spaced location from said upstream node;

an intermediate node connected to said communication path at an intermediate location between said first local node and said upstream node;

a control channel connected to said intermediate node, said first local node and said second local node;

a second control channel connected to said first local node and said second local node;

said intermediate node monitors said communication path for a collision between a plurality of data packets from said first and second nodes and if a collision is detected, said intermediate node drives said control channel with a collision indicating signal which instructs each of said local nodes to re-transmit after waiting a period of time;

wherein said second control channel is used to send a busy-idle status of said upstream channel to said first and second local nodes;

wherein the collision on said communication path is sensed faster and said collision indicating signal on said control channel is communicated more quickly than if the collision detecting and the collision indicating signaling had been provided by said upstream node because the closer location of the collision monitoring and the collision signal driving at said intermediate location of said intermediate node reduces propagation delays.

3. The apparatus set forth in claim 2 wherein a data frame that has not experienced a collision propagates along said upstream channel from any of said first and second nodes and is received and accepted by said upstream node.

4. The apparatus set forth in claim 2 wherein said upstream node has means for detecting a collision such that after said collision between said plurality of data frames propagates along said communication path to said upstream node said collision is detected by said means for detecting a collision of said upstream node and discarded.

5. Apparatus set forth in claim 4 wherein IEEE 802.3 CSMA/CD, 1993, carrier sensing multiple access with collision detection protocol is used between the intermediate node and the local nodes.

6. The apparatus set forth in claim 5 wherein the time reductions of said intermediate node are used to greatly extend the distance that said local nodes can be located from said upstream node and still use IEEE 802.3 CSMA/CD carrier sensing multiple access with collision detection protocol to communicate data without resorting to a re-timing repeater or a packet relaying bridge.

7. The apparatus set forth in claim 2, further comprising:

said downstream channel connected to said upstream node and said first and second nodes in a spaced relationship with said upstream node similar to that of the upstream channel; and said downstream channel communicates data frames that are broadcast by said upstream node to at least one of said first and second nodes.

8. A method for communicating within a network having a plurality of local nodes in a widely spaced relation with a destination node, comprising the steps of:

sensing for an idle status of an upstream channel by a first local node before transmitting a first data frame;

sensing for an idle status of the upstream channel by a second local node before transmitting a second data frame, detecting an idle status by both the first and second local nodes and both begin transmitting their respective data frames causing a collision on said upstream channel;

detecting this collision by an intermediate node monitoring said upstream channel;

sending a collision control signal from said intermediate node to each local node stopping each node before it completes the transmitting its respective data frame;

detecting by the destination node the data frame resulting from said collision which is shorter than a standard data frame because each node involved in the collision was stopped before each data frame involved in the collision was completed;

discarding the data frame resulting from said collision;

changing said collision control signal to an idle signal which causes each local node involved in the collision to wait a random period of time before re-transmitting the data frame that underwent the collision; and re-transmitting the data frame by one of the local nodes to the destination node without a collision.

9. The method of claim 8, further comprising the step of re-transmitting another data frame by another local node to the destination node without a collision.

10. The method of claim 8, further comprising the step of sensing said re-transmitting of the data frame by one of the local nodes to the destination node by said intermediate node and changing said idle control signal to busy by said intermediate node.

* * * * *